(12) United States Patent
Takechi

(10) Patent No.: US 8,882,013 B2
(45) Date of Patent: Nov. 11, 2014

(54) TORQUE LIMITING DEVICE FOR FISHING REEL

(75) Inventor: Kunio Takechi, Osaka (JP)

(73) Assignee: Shimano Inc., Osaka (JP)

(*) Notice: Subject to any disclaimer, the term of this patent is extended or adjusted under 35 U.S.C. 154(b) by 138 days.

(21) Appl. No.: 13/567,600

(22) Filed: Aug. 6, 2012

(65) Prior Publication Data
US 2013/0075218 A1  Mar. 28, 2013

(30) Foreign Application Priority Data

Sep. 27, 2011  (JP) ................................. 2011-211082

(51) Int. Cl.
| | |
|---|---|
| *A01K 89/01* | (2006.01) |
| *F16D 7/04* | (2006.01) |
| *A01K 89/015* | (2006.01) |
| *F16D 43/202* | (2006.01) |

(52) U.S. Cl.
CPC .............. *F16D 7/048* (2013.01); *A01K 89/015* (2013.01); *F16D 43/2028* (2013.01)
USPC ............................ 242/268; 242/258; 242/264

(58) Field of Classification Search
USPC ......... 242/257, 258, 262, 263, 264, 267, 268, 242/301, 298, 302
See application file for complete search history.

(56) References Cited

U.S. PATENT DOCUMENTS

| | | | | |
|---|---|---|---|---|
| 2,523,134 | A | | 9/1950 | Maynes |
| 2,768,547 | A | * | 10/1956 | Noell ............................... 81/480 |
| 3,958,469 | A | * | 5/1976 | Meese ............................ 81/58.3 |
| 4,238,978 | A | * | 12/1980 | Leone ............................. 81/480 |
| 5,954,285 | A | * | 9/1999 | Whisenhunt .................. 242/250 |
| 6,422,497 | B1 | * | 7/2002 | Kyon ............................. 242/267 |
| 7,343,824 | B2 | * | 3/2008 | Gao ........................... 73/862.21 |
| 7,389,700 | B2 | * | 6/2008 | Gao ........................... 73/862.21 |
| 7,913,594 | B2 | * | 3/2011 | Gauthier et al. ................ 81/467 |

* cited by examiner

*Primary Examiner* — Emmanuel M Marcelo
(74) *Attorney, Agent, or Firm* — Global IP Counselors

(57) ABSTRACT

A torque limiting device for a fishing reel is provided. The torque limiting device is configured to limit torque between a rotatable shaft member and a rotary member disposed on an outer peripheral side of the shaft member in the fishing reel. The torque limiting device includes a first pin member being disposed in the shaft member, where the first pin member is configured to protrude towards and retract from the rotary member and the first pin member has a first spherical tip, an urging member is disposed in the shaft member, where the urging member is configured to urge the first pin member towards the rotary member, and a first recess is disposed on the rotary member to allow the tip of the first pin member to be engaged therewith.

9 Claims, 7 Drawing Sheets

US 8,882,013 B2

TORQUE LIMITING DEVICE FOR FISHING REEL

CROSS-REFERENCE TO RELATED APPLICATIONS

This application claims priority to Japanese Patent Application No. 2011-211082 filed on Sep. 27, 2011. The entire disclosure of Japanese Patent Application No. 2011-211082 is hereby incorporated herein by reference.

BACKGROUND

1. Field of the Invention

The present invention relates to a torque limiting device, particularly to a torque limiting device for a fishing reel, which is configured to limit torque between a rotatable shaft member and a rotary member disposed on the outer peripheral side of the shaft member in the fishing reel.

2. Background Art

The dual-bearing reels are provided with a fishing-line guide device, which is so-called a level winding mechanism. The level winding mechanism includes a driven gear (an exemplary rotary member), a traverse cam shaft and a fishing-line guide. The driven gear is a member to which rotation of a handle shaft is transmitted. The traverse cam shaft is configured to be unitarily rotated with the driven gear. The fishing-line guide is configured to be axially reciprocated while being meshed with the traverse cam shaft. The traverse cam shaft has intersecting helical grooves on the outer peripheral surface thereof. The fishing-line guide includes an engaging member to be engaged with the helical grooves. In this type of level winding mechanism, an art for limiting torque to be transmitted from the handle shaft to the driven gear has been known (see e.g., U.S. Pat. No. 2,523,134).

The well-known torque limiting device for a fishing reel is mounted on the driven gear. The driven gear is configured to be rotated through an intermediate gear in conjunction with rotation of the spool shaft. The driven gear has an inner member and an outer member. The inner member is configured to be unitarily rotated with the traverse cam shaft (an exemplary shaft member). The outer member is rotatably supported by the inner member. The torque limiting device includes a spring member disposed between the inner member and the outer member. The spring member, having an annular shape, is formed by curving a spring wire rod in a circular shape. The spring member is locked with the inner member. The spring member makes contact with an annular groove formed on the outer member. Torque is limited by the urging force of the spring member.

SUMMARY

In the well-known torque limiting device, the driven gear as the rotary member is divided into the inner member and the outer member, and torque is limited by the spring member disposed between the inner member and the outer member. Therefore, the radial size of the rotary member is increased, and thus the rotary member cannot be compactly formed.

It is an advantage of the present invention to compactly form a rotary member in a torque limiting device for a fishing reel.

A torque limiting device for a fishing reel is provided. The torque limiting device is configured to limit torque between a rotatable shaft member and a rotary member disposed on an outer peripheral side of the shaft member in the fishing reel. The torque limiting device includes a first pin member being disposed in the shaft member, where the first pin member is configured to protrude towards and retract from the rotary member and the first pin member has a first spherical tip, an urging member is disposed in the shaft member, where the urging member is configured to urge the first pin member towards the rotary member, and a first recess is disposed on the rotary member to allow the tip of the first pin member to be engaged therewith.

BRIEF DESCRIPTION OF THE DRAWINGS

Referring now to the attached drawings which form a part of this original disclosure.

DETAILED DESCRIPTION OF EXEMPLARY EMBODIMENTS

Structure of Dual-Bearing Reel

Figure 1:
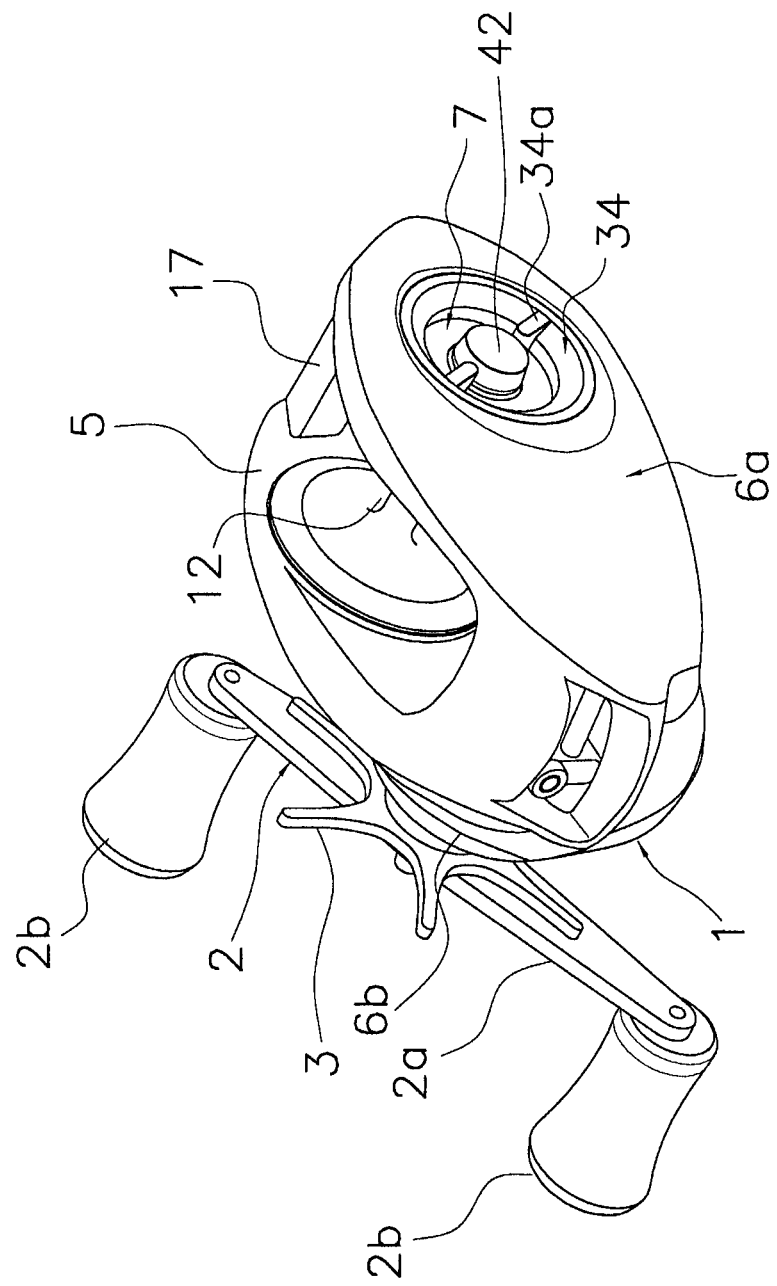
FIG. 1 is a perspective view of a dual-bearing reel according to a first exemplary embodiment of the present invention.

In FIG. 1, a dual-bearing reel according to a first exemplary embodiment of the present invention is a low profile reel. The dual-bearing reel includes a reel unit 1, a handle 2 for rotating a spool and a spool 12 for winding a fishing line. The handle 2 is disposed laterally to (e.g., on the left side of) the reel unit 1. The spool 12 is rotatably and detachably attached to the inside of the reel unit 1. Further, a drag regulation member 3 is disposed on the reel unit 1 side of the handle 2 in order to regulate drag.

Figure 2:
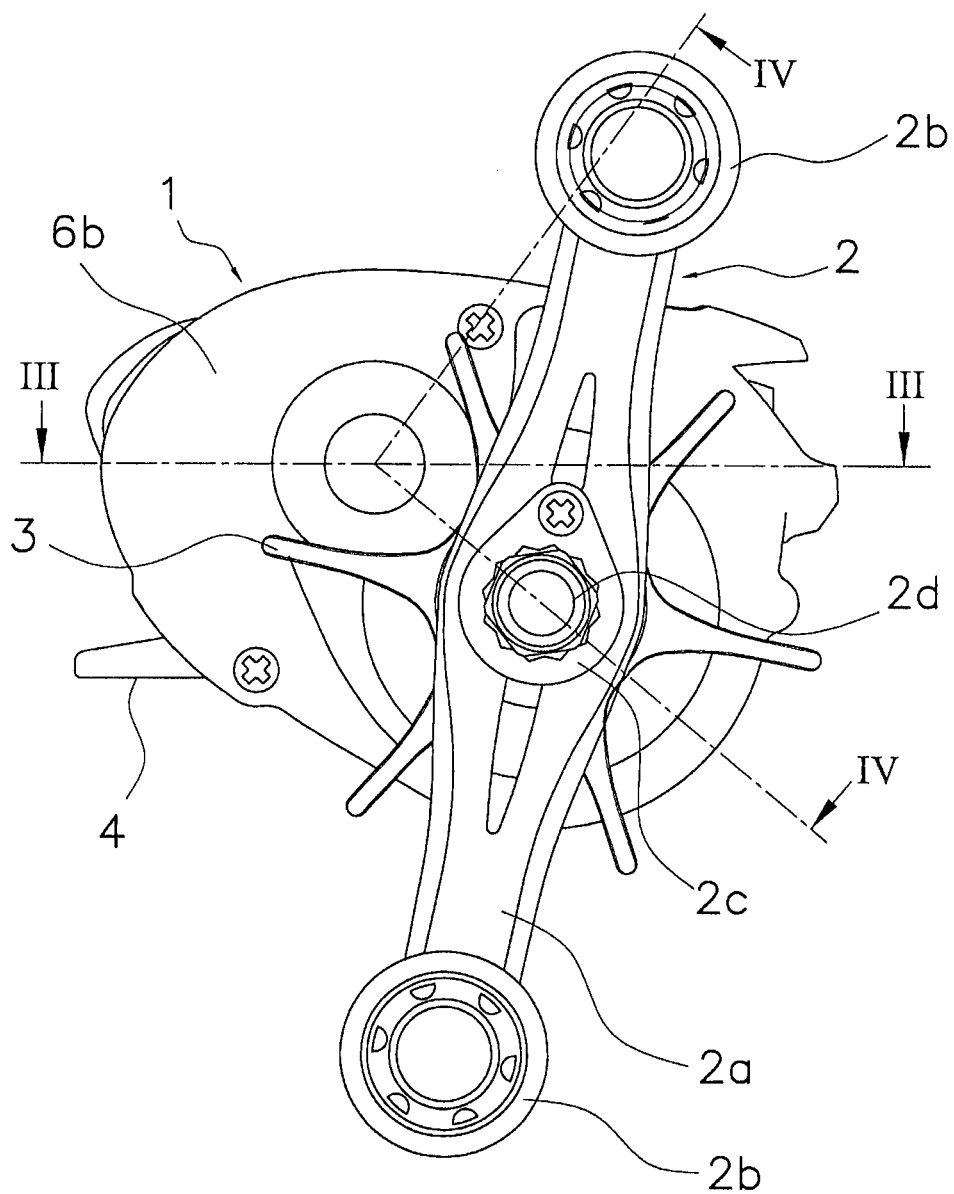
FIG. 2 is a side view of the dual-bearing reel seen from a handle attachment side.

The handle 2 is of a double-handle type including a handle arm 2a and two knob portions 2b. The handle arm 2a is a plate-shaped member made of, for instance, metal. The knob portions 2b are rotatably attached to the both ends of the handle arm 2a. As illustrated in FIG. 2, the handle arm 2a is non-rotatably fixed to a tip of a handle shaft 30 by a nut 2d. Rotation of the nut 2d is prevented by a retainer 2c fixed to the outer surface of the handle arm 2a by a screw.

Figure 3:
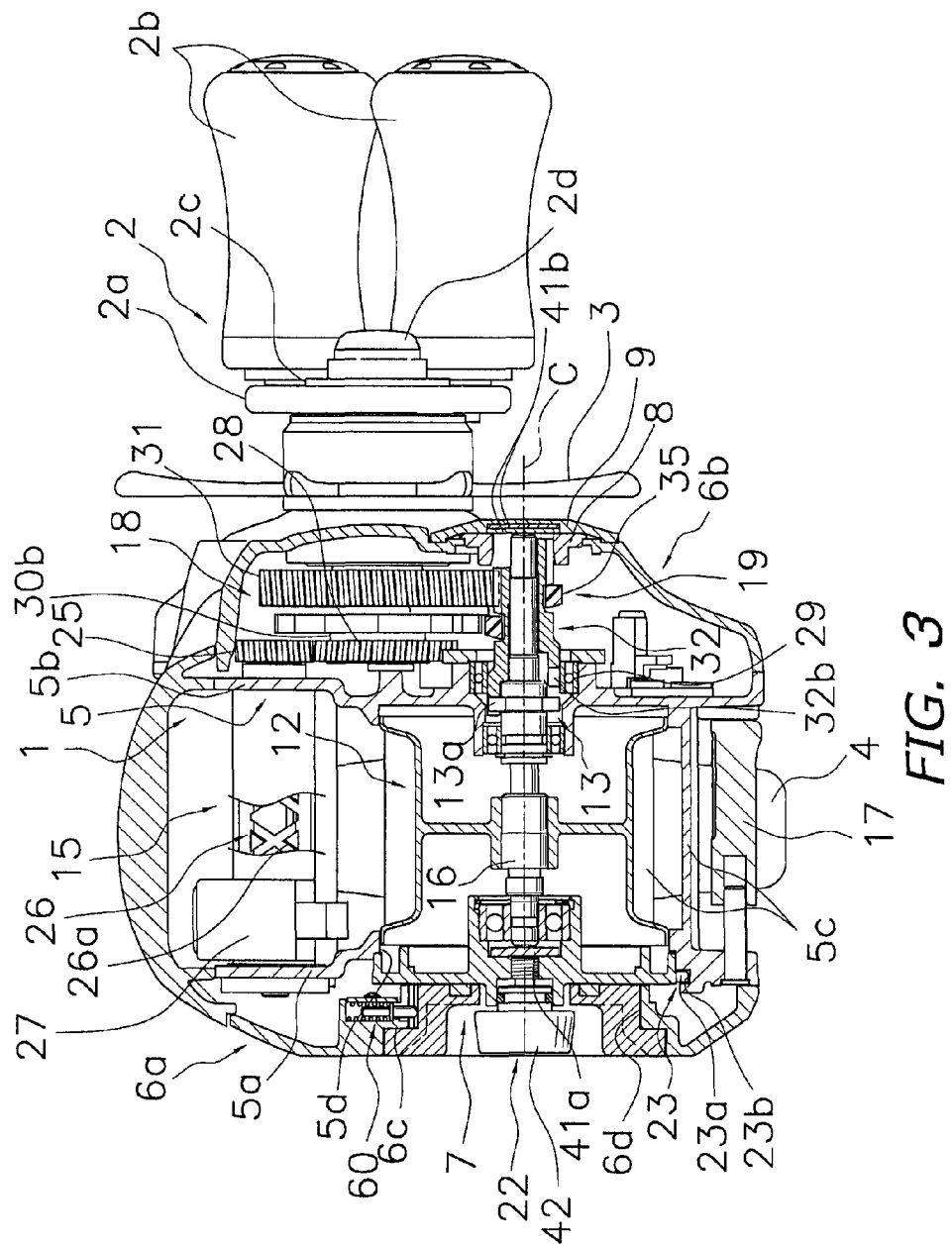
FIG. 3 is a cross-sectional view of FIG. 2 sectioned along a cutting line III-III.
Figure 4:
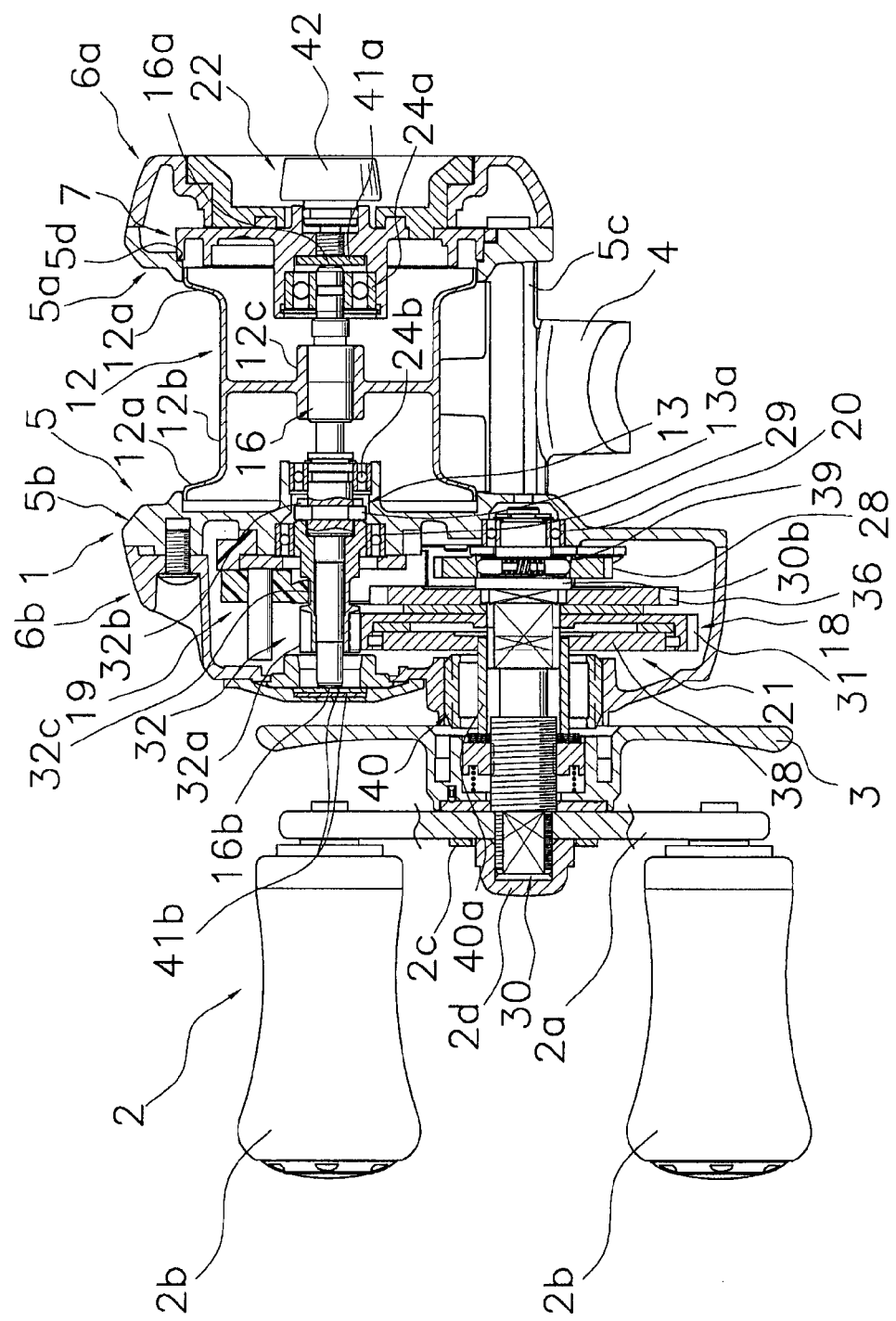
FIG. 4 is a cross-sectional view of FIG. 2 sectioned along a cutting line IV-IV.

As illustrated in FIGS. 3 and 4, the reel unit 1 includes a frame 5, a first side cover 6a, a second side cover 6b, and a shaft support part 7. The first and second side covers 6a and 6b are attached to the both lateral sides of the frame 5 for laterally covering the frame 5. The shaft support part 7 is detachably attached to a lateral part of the frame 5. The first side cover 6a is disposed on the opposite side of the handle 2, while the second side cover 6b is disposed on the attachment side of the handle 2.

The frame 5 is a member made of light metal (e.g., aluminum alloy, magnesium alloy, etc.) and includes a first side plate 5a, a second side plate 5b, and a plurality of coupling portions 5c. The first and second side plates 5a and 5b are opposed at a predetermined interval. The coupling portions 5c couple the first and second side plates 5a and 5b. The shaft support part 7 is detachably attached to the first side plate 5a disposed on the opposite side of the handle attachment side. The first side plate 5a includes a circular opening 5d for allowing the spool 12 to pass therethrough. The shaft support part 7 is detachably attached to the opening 5db, for instance, by a bayonet mechanism 23 in order to take out the spool 12 from the opening 5d side. Further, a fishing rod attachment leg 4 is integrally formed with two bottom-side coupling portions 5c. The fishing rod attachment leg 4 is a member elongated back and forth for attaching the dual-bearing reel to a fishing rod.

The first side cover 6a is a member made of light metal (e.g., aluminum alloy, magnesium alloy, etc.) and covers the outside of the first side plate 5a. The first side cover 6a has a circular recess 6c in the center part thereof. The recess 6c is recessed in a plurality of stages. The recess 6c has a circular knob opening 6d in the center part thereof. The shaft support part 7 is exposed to the outside through the knob opening 6d. The first side cover 6a is interposed and held by the shaft support part 7 and is thereby detachably attached to the frame 5 together with the shaft support part 7. In a position radially outwards of the shaft support part 7, a positioning mechanism 60 is disposed on the inner peripheral part of the knob opening 6d of the first side cover 6a. The positioning mechanism 60 is configured to prevent rotation of the shaft support part 7 of a non-operated state and appropriately position the shaft support part 7 of an operated state.

The second side cover 6b is a member made of light metal (e.g., aluminum alloy, magnesium alloy, etc.) and is fixed to the second side plate 5b of the frame 5 by screws. The second side cover 6b includes a boss portion 8 and a lid member 9. The boss portion 8 is disposed in a position where a spool shaft 16 is disposed. The lid member 9 closes an opening of the boss portion 8. The boss portion 8 is fixed to the second side cover 6b, for instance, by swaging. The lid member 9 is fixed to the second side cover 6b by screws. The inner diameter of the boss portion 8 is slightly greater than the outer diameter of a gear portion 32a of a pinion gear 32 to be described. Therefore, the gear portion 32a can enter the inner peripheral side of the boss portion 8.

The shaft support part 7 is rotatably attached to the first side cover 6a while interposing and holding the first side cover 6a between components thereof. Therefore, the shaft support part 7 is prevented from being detached from the first side cover 6a. Further, the shaft support part 7 is detachably attached to the first side plate 5a by the bayonet mechanism 23 as illustrated in FIG. 3. The bayonet mechanism 23 includes a plurality of (e.g., three) plate-shaped protruding portions 23a and a plurality of (e.g., three) groove-shaped engaging recesses 23b. The protruding portions 23a protrude radially outwards from the outer periphery of the shaft support part 7 while being circumferentially aligned at predetermined intervals on the outer periphery of the shaft support part 7. The engaging recesses 23b are formed outside the opening 5d of the first side plate 5a for engaging with the protruding portions 23a. The shaft support part 7 is turned and attached to the first side plate 5a by the bayonet mechanism 23. Accordingly, the first side cover 6a is also attached to the first side plate 5a.

Figure 5:
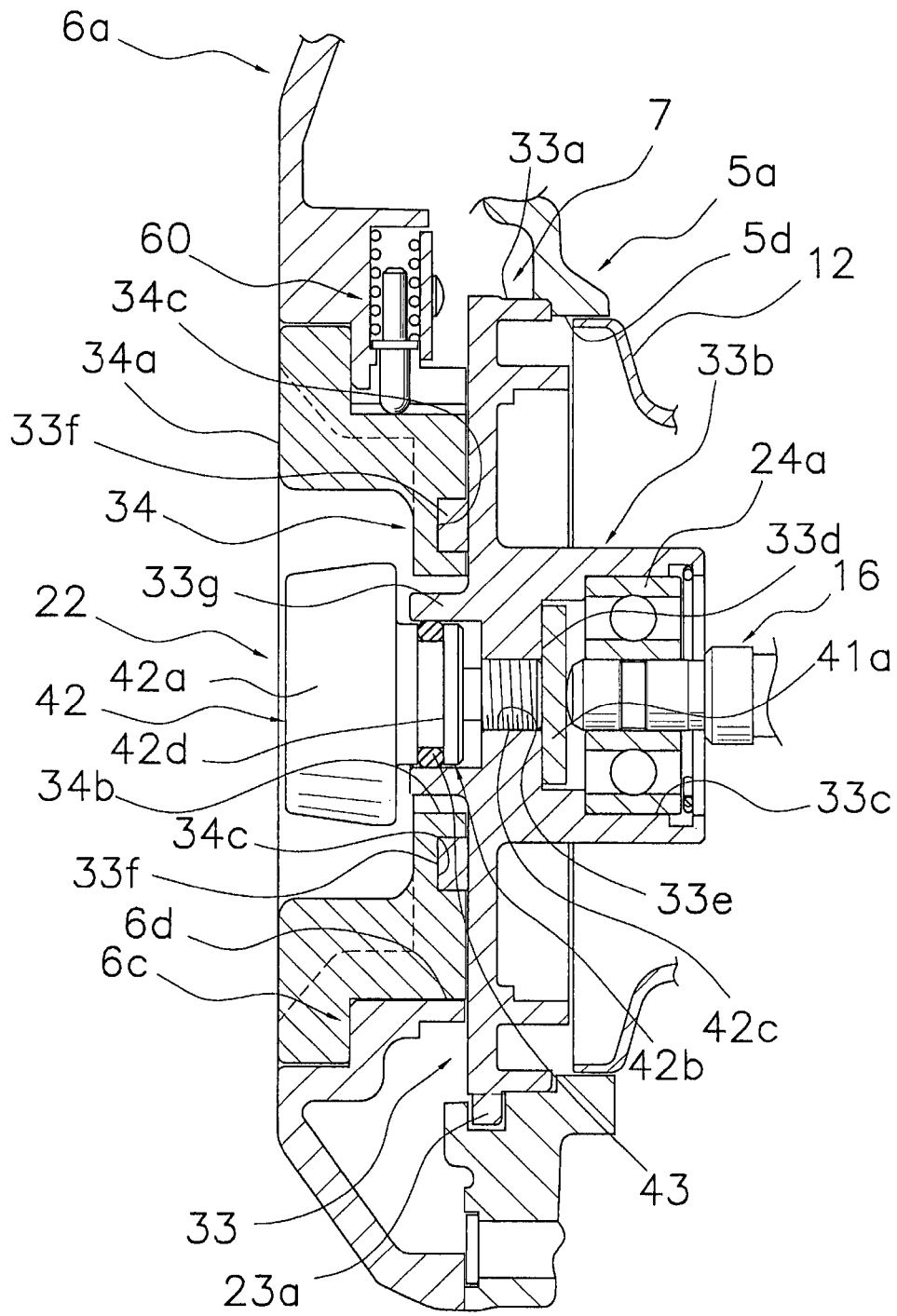
FIG. 5 is a partial cross-sectional view of the dual-bearing reel on a first side cover side.

As illustrated in FIG. 5, the shaft support part 7 includes a bearing mounting portion 33 and an attachment/detachment operating portion 34. The bearing mounting portion 33 is a portion where a first bearing 24a is mounted. The attachment/detachment operating portion 34, together with the bearing mounting portion 33, interposes and holds the first side cover 6a therebetween in a relatively rotatable state. The bearing mounting portion 33 is a saucer-shaped member. An outer periphery 33a of the bearing mounting portion 33 is fitted into the opening 5d. Further, the outer periphery 33a has the plural protruding portions 23a of the bayonet mechanism 23. The protruding portions 23a protrude radially outwards from the outer periphery 33a while being circumferentially aligned about the axis of the spool 12 at predetermined intervals. The bearing mounting portion 33 has a tubular bearing accommodation portion 33b in the center part thereof. The bearing accommodation portion 33b protrudes towards the spool 12 in a tubular shape for accommodating the first bearing 24a. The bearing accommodation portion 33b has a stepped tubular mounting space 33c for mounting the first bearing 24a to the inner peripheral surface thereof. A disc-shaped first plate 41a, forming a part of a casting control mechanism 22 to be described, is attached to a bottom portion 33d of the mounting space 33c. The bottom portion 33d has a female threaded portion 33e that a brake knob 42 to be described is screwed. The bearing mounting portion 33 has a plurality of (e.g., two) positioning convex portions 33f on the surface thereof that makes contact with the attachment/detachment operating portion 34. The positioning convex portions 33f protrude in parallel to the axis of the spool 12 while being circumferentially aligned about the axis of the spool shaft 16 at predetermined intervals. The bearing mounting portion 33 has a tubular seal arrangement portion 33g protruding axially outwards on the outer surface thereof.

As illustrated in FIG. 5, the attachment/detachment operating portion 34 is a stepped cylindrical member fixed to the bearing mounting portion 33 by a screw member (not illustrated in the figures). The attachment/detachment operating portion 34 serves to perform an attachment/detachment operation of the shaft support part 7. The outer surface of the attachment/detachment operating portion 34 is slightly recessed than that of the first side cover 6a. The attachment/detachment operating portion 34 has a rib 34a disposed on the diameter thereof for performing an attachment/detachment operation. The rib 34a has a shape further protruding radially inwards and axially outwards than the other part of the attachment/detachment operating portion 34. The attachment/detachment operating portion 34 has an opening 34b in the center part thereof. The seal arrangement portion 33g protrudes into the opening 34b. Further, the attachment/detachment operating portion 34 has a plurality of (e.g., two) positioning recesses 34c on the wall surface thereof (i.e., the bearing mounting portion 33 side wall surface). The positioning convex portions 33f are engaged with the positioning recesses 34c.

As illustrated in FIGS. 3 and 4, the frame 5 accommodates the spool 12 for winding a fishing line, a level winding mechanism 15 and a clutch operating member 17. The spool 12 can be disposed along a direction perpendicularly to a fishing rod. The level winding mechanism 15 is configured to uniformly wind the fishing line onto the spool 12. The clutch operating member 17 functions as a thumb pad in thumbing the fishing line. Further, a gear mechanism 18, a clutch mechanism 13, a clutch control mechanism 19, a drag mechanism 21 and the casting control mechanism 22 are disposed between the frame 5 and the second side cover 6b. The gear mechanism 18 is configured to transfer rotational force from the handle 2 to the spool 12 and the level winding mechanism 15. The clutch control mechanism 19 is configured to execute an on/off control of the clutch mechanism 13. The drag mechanism 21 is configured to brake rotation of the spool 12 in a fishing-line releasing direction. The casting control mechanism 22 is configured to regulate resistive force to be applied during rotation of the spool 12.

As illustrated in FIG. 4, the spool 12 has a pair of saucer-shaped flanges 12a on the both lateral parts thereof. Further, the spool 12 has a tubular bobbin trunk 12b between the flanges 12a. Yet further, the spool 12 has a tubular boss 12c integrally formed with a substantially axial center part of the inner periphery of the bobbin trunk 12b. The spool 12 is non-rotatably fixed onto the spool shaft 16 penetrating the boss 12c, for instance, by serration coupling. The method of fixing the spool 12 onto the spool shaft 16 is not limited to the serration coupling and a variety of coupling methods (e.g., key coupling, spline coupling, etc.) can be herein employed instead.

The spool shaft 16 is extended to the second side cover 6b while penetrating through the second side plate 5b. The spool shaft 16 is rotatably supported by the reel unit 1 through the first bearing 24a and a second bearing 24b on the axially both sides of the boss 12c of the spool 12. The first bearing 24a is mounted to the shaft support part 7, while the second bearing 24b is mounted to the second side plate 5b. A first end surface 16a and a second end surface 16b of the spool shaft 16 respectively protrude and are formed in either a chevron shape or a circular-arc shape. The first and second end surfaces 16a and 16b of the spool shaft 16 can make contact with the casting control mechanism 22.

An engaging pin 13a, forming a part of the clutch mechanism 13, is fixed to a part of the spool shaft 16 that penetrates through the second side plate 5b. The engaging pin 13a penetrates through the spool shaft 16 along its diameter, while the both ends thereof radially protrude from the spool shaft 16. The tip (i.e., the right end in FIG. 2) of the pinion gear 32 to be described can be engaged with the both protruding ends of the engaging pin 13a.

As illustrated in FIG. 3, the level winding mechanism 15 includes a second gear 25, a traverse cam shaft 26 and a fishing line guide 27. The second gear 25 is meshed with a first gear 28 of the gear mechanism 18 to be described. The traverse cam shaft 26 is a shaft member having helical grooves 26a intersecting with each other on the outer peripheral surface thereof. The fishing line guide 27 is a portion that the fishing line is inserted therethrough. The fishing line guide 27 is engaged with the helical grooves 26a. The fishing line guide 27 is configured to reciprocate in parallel to and in front of the spool 12 in conjunction with rotation of the traverse cam shaft 26. Thus, the fishing line can pass through the fishing line guide 27 and is uniformly wound about the spool 12 in conjunction with reciprocation of the fishing line guide 27.

The gear mechanism 18 includes the handle shaft 30, a driving gear 31, the pinion gear 32 and the first gear 28. The driving gear 31 is rotatably mounted onto the handle shaft 30. The pinion gear 32 is a tubular gear to be meshed with the driving gear 31. The first gear 28 is meshed with the second gear 25 while being mounted onto the handle shaft 30. The handle shaft 30 is prevented from rotating in the fishing-line releasing direction by a roller-type one-way clutch 40. In other words, the handle shaft 30 is allowed to rotate only in the fishing-line winding direction. The one-way clutch 40 is mounted to the second side cover 6b. The base end of the handle shaft 30 is rotatably supported by the second side plate 5b through a bearing 20. A ratchet wheel 36 is disposed on the rear side (i.e., the left side in FIG. 3) of the driving gear 31 while being mounted onto the handle shaft 30 in a unitarily rotatable state. The first gear 28 is disposed on the rear side of the ratchet wheel 36. The handle shaft 30 has a large-diameter contact portion 30b between its portion for mounting the ratchet wheel 36 and its portion for mounting the first gear 28. Rotation of the handle shaft 30 is transferred to the driving gear 31 through the drag mechanism 21.

As illustrated in FIG. 4, the pinion gear 32 is extended axially outwards from the second side plate 5b. The pinion gear 32 is a tubular member that the spool shaft 16 penetrates through the center thereof. The pinion gear 32 is mounted onto the spool shaft 16 while being axially movable. The pinion gear 32 has the gear portion 32a, an engaging portion 32b and a narrowed portion 32c. The gear portion 32a is formed on the base end of the pinion gear 32. The engaging portion 32b is formed on the tip end of the pinion gear 32 and can be engaged with the engaging pin 13a. The narrowed portion 32c is disposed between the gear portion 32a and the engaging portion 32b. The driving gear 31 is meshed with the gear portion 32a. The engaging pin 13a is engaged with the engaging portion 32b. A clutch yoke 35 of the clutch control mechanism 19 is engaged with the narrowed portion 32c. The pinion gear 32 is configured to be moved between a clutch-on position illustrated above a center line C in FIG. 3 and a clutch-off position illustrated below the center line C in FIG. 3 in conjunction with either an operation of the clutch operating member 17 or rotation of the handle 2 in the fishing-line winding direction. The pinion gear 32 is supported by the second side plate 5b through a bearing 29 while being rotatable and axially movable.

As illustrated in FIG. 4, the first gear 28 is coupled to the handle shaft 30 through a torque limiter 39 (an exemplary torque limiting device for a fishing reel). As illustrated in FIG. 3, the first gear 28 is meshed with the second gear 25 mounted onto the traverse cam shaft 26 of the level winding mechanism 15.

Torque Limiter Structure

Figure 6:
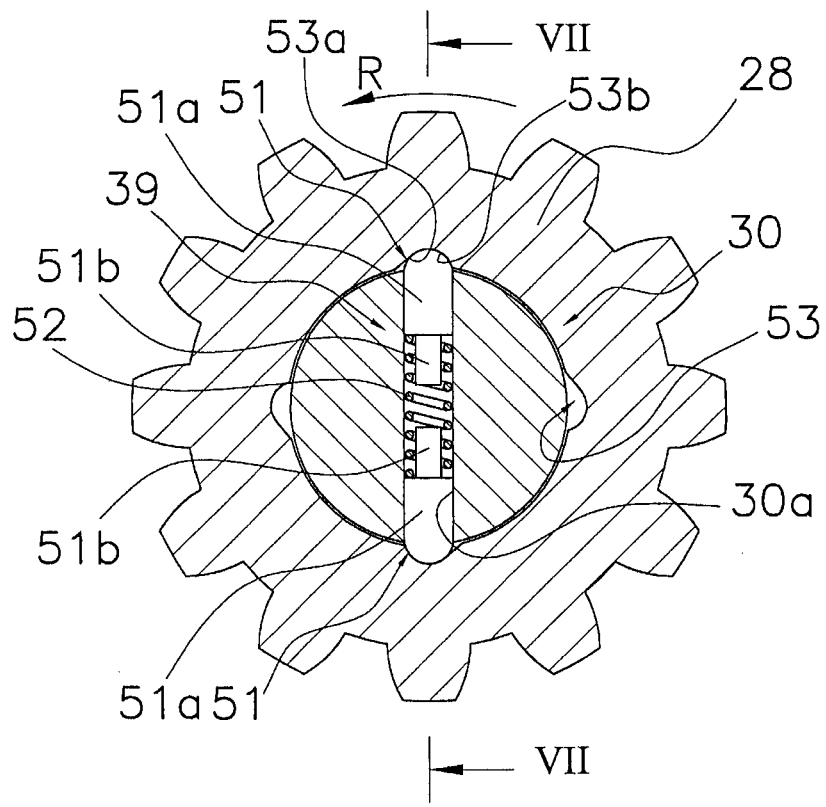
FIG. 6 is a cross-sectional view of a part of a handle shaft where a first gear is mounted.
Figure 7:
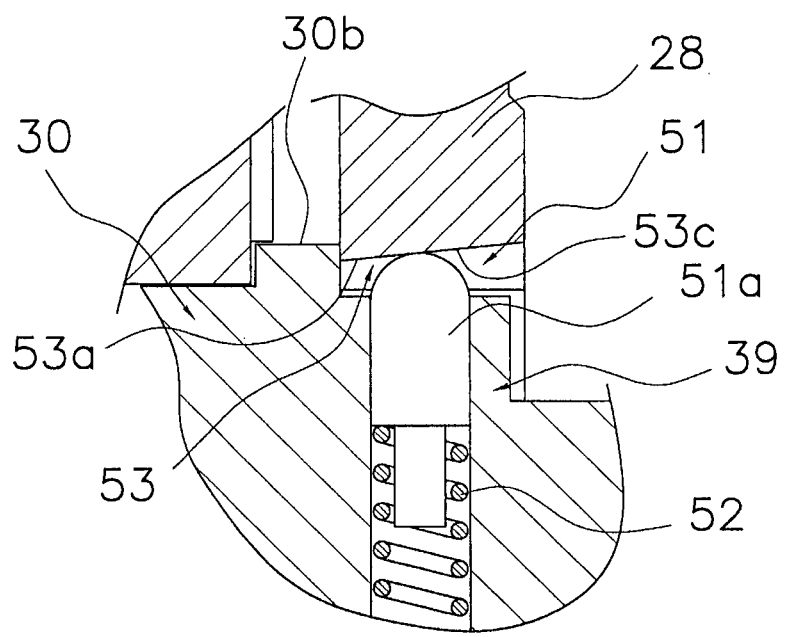
FIG. 7 is a partial cross-sectional view of FIG. 6 sectioned along a cutting line VII-VII.

The torque limiter 39 is provided for preventing excessive force from acting on the first gear 28 (an exemplary rotary member) and the second gear 25 when the level winding mechanism 15 is broken down. As illustrated in FIGS. 6 and 7, the torque limiter 39 includes a pair of pin members 51, an urging member 52 and at least a locking recess 53. The pin members 51 are disposed in the handle shaft 30 (an exemplary shaft member). The urging member 52 is, for instance, a coil spring for urging the paired pin members 51 towards the first gear 28. At least one locking recess 53 is formed on the inner peripheral surface of the first gear 28. In the present exemplary embodiment, four locking recesses 53 are formed thereon while being circumferentially aligned at predetermined intervals.

The handle shaft 30 includes a through hole 30a penetrating therethrough in a diameter direction for allowing the pin members 51 to be inserted therein such that the pin members 51 are protrudable and retractable. Each pin member 51 has a head portion 51a and a shaft portion 51b. The head portion 51a has a curved surface of a hemispheric cannonball shape, while the shaft portion 51b has a diameter smaller than that of the head portion 51a. The pin members 51 are disposed within the through hole 30a while the head portions 51a are directed to the locking recesses 53. The urging member 52 is disposed on the outer peripheral side of the shaft portions 51b of the paired pin members 51 while being compressed between the paired head portions 51a. Each locking recess 53 has a linear slope 53a and a cylindrical surface 53b. The slope 53a is disposed downstream in a rotational direction (i.e., a fishing-line winding direction) of the first gear 28 depicted with an arrow R, while the cylindrical surface 53b is disposed upstream in the rotation direction of the first gear 28. Therefore, rotation of the handle shaft 30 is normally transmitted to the first gear 28 when the pin members 51 press the slopes 53a. With the structure, the pin members 51 are configured to retract into the through hole 30a when excessive force acts on the first gear 28 by strongly rotating the handle 2 while foreign substance gets stuck in the level winding mechanism 15. Accordingly, the handle shaft 30 idles and this prevents the first gear 28 from being easily damaged or broken down. As illustrated in FIG. 7, the contact surface (the slope 53a and the cylindrical surface 53b) of each locking recess 53, which is contactable with one of the head portions 51a, has a slope 53c intersecting with the axis of the handle shaft 30. Each slope 53c is slanted for gradually getting closer to the axis of the handle shaft 30 towards the driving gear 31. When the first gear 28 is manufactured by molding, the slope 53c can be formed using the draft angle of a mold. With the structure, force of pressing the first gear 28 towards the contact portion 30b is produced when the pin members 51 press the first gear 28. The first gear 28 is thereby prevented from being easily wobbled in its rotation.

The clutch mechanism 13 includes the engaging pin 13a and the engaging portion 32b of the pinion gear 32. The clutch mechanism 13 can be set to be in either of the clutch-on state and the clutch-off state in response to an operation of the clutch operating member 17. In the clutch-on state, rotation of the handle 2 is transmitted to the spool 12. In the clutch-off state, the spool 12 can be freely rotated.

As illustrated in FIGS. 1 and 3, the clutch operating member 17 is disposed rearwards of the spool 12 while being disposed in the rear part of the space interposed between the first side plate 5a and the second side plate 5b. The frame 5 has an elongated hole (not illustrated in the figures) in each of the first and second side plates 5a and 5b. The clutch operating member 17 is rotatably supported by the elongated holes. Therefore, the clutch operating member 17 can be slid up and down along the elongated holes.

The clutch control mechanism 19 includes the clutch yoke 35. The clutch yoke 35 is disposed on the outer peripheral side of the spool shaft 16. The clutch yoke 35 is supported by two pins (not illustrated in the figures) while being movable in parallel to the axis of the spool shaft 16. It should be noted that the spool shaft 16 can be rotated relatively to the clutch yoke 35. In other words, the clutch yoke 35 is configured not to be rotated even when the spool shaft 16 is rotated. Further, the clutch yoke 35 is movable right and left in FIG. 3 while the middle part thereof is engaged with the narrowed portion 32c of the pinion gear 32. The clutch yoke 35 is constantly urged in a clutch-on direction (i.e., inwards, more specifically, leftwards in FIG. 3) by a spring (not illustrated in the figures).

In the structure as described above, the pinion gear 32 is normally disposed in the inner clutch-on position while being engaged with the engaging pin 13a of the spool shaft 16. Thus, the clutch-on state is produced. When the pinion gear 32 is moved outwards by the clutch yoke 35, on the other hand, engagement between the pinion gear 32 and the engaging pin 13a is released. Thus, the clutch-off state is produced. The gear portion 32a of the pinion gear 32 is herein disposed on the inner peripheral side of the boss portion 8 as illustrated below an axis C in FIG. 3. Therefore, the pinion gear 32 is prevented from being easily wobbled in the clutch-off state.

As illustrated in FIG. 4, the drag mechanism 21 includes the drag regulation member 3, a pressure plate 38 and the one-way clutch 40. The drag regulation member 3 is used for an operation of regulating drag force. The pressure plate 38 is mounted onto the handle shaft 30 in a unitarily rotatable state. The one-way clutch 40 is mounted to the second side cover 6b while being disposed in the surrounding of the handle shaft 30. The pressure plate 38 is coupled to an inner race 40a of the one-way clutch 40 in a unitarily rotatable state. When the pressure plate 38 is pressed towards the driving gear 31 by an operation of rotating the drag regulation member 3, slippage is caused between the pressure plate 38 and the driving gear 31. The drag mechanism 21 is thus configured to brake the spool 12. To actuate the drag mechanism 21, the one-way clutch 40 is configured to prevent the handle shaft 30 from rotating in the fishing-line releasing direction.

Structure of Casting Control Mechanism

As illustrated in FIGS. 3 and 4, the casting control mechanism 22 includes the first plate 41a, second plates 41b and the brake knob 42. The first and second plates 41a and 41b are disposed for holding and interposing therebetween the both ends of the spool shaft 16. The brake knob 42 serves to regulate force of the first and second plates 41a and 41b for holding and interposing therebetween the spool shaft 16.

As described above, the single first plate 41a is disposed on the left side (see FIG. 3) while being mounted to the bottom portion 33d of the mounting space 33c within the bearing mounting portion 33. The first plate 41a can make contact with a first end 16a of the spool shaft 16. The two second plates 41b are mounted to the inside of the boss portion 8 of the second side cover 6b.

As illustrated in FIG. 5, the brake knob 42 has an operating portion 42a, a seal attachment portion 42b, and a male threaded portion 42c. The operating portion 42a is a circular portion. The seal attachment portion 42b has a diameter smaller than that of the operating portion 42a. The male threaded portion 42c has a diameter smaller than that of the seal attachment portion 42b. In the present exemplary embodiment, the operating portion 42a has a circular truncated cone shape. The outer peripheral side of the operating portion 42a is disposed away from the attachment/detachment operating portion 34 at a clearance produced for operating the operating portion 42a. The brake knob 42 is disposed in the recess 6c of the first side cover 6a while being prevented from protruding from the outer surface of the first side cover 6a. In the present exemplary embodiment, the attachment/detachment operating portion 34 is also disposed in the recess 6c. Therefore, the operating portion 42a is thus disposed away from the attachment/detachment operating portion 34 at the clearance. The seal attachment portion 42b has an annular seal attachment groove 42d. An O-ring 43 is attached onto the seal attachment groove 42d. The O-ring 43 is disposed for making contact with the inner peripheral surface of the seal arrangement portion 33g and the seal attachment groove 42d. The male threaded portion 42c is screwed into the female threaded portion 33e of the bearing mounting portion 33. The male threaded portion 42c can make contact with the first plate 41a.

Method of Operating Dual-bearing Reel

The clutch yoke 35 is normally pressed inwards (leftwards in FIG. 3). The pinion gear 32 is thereby moved to an engaged position. The clutch-on state is herein produced, while the pinion gear 32 and the engaging pin 13a of the spool shaft 16 are meshed. Rotational force from the handle 2 is herein transmitted to the spool 12 through the handle shaft 30, the driving gear 31, the pinion gear 32, and the spool shaft 16. The spool 12 is accordingly rotated in the fishing-line winding direction.

In fishing, braking force is regulated by the casting control mechanism 22 for inhibiting occurrence of backlash. In regulating braking force with the casting control mechanism 22, the brake knob 42 is turned in the clockwise direction, for instance. The brake knob 42 thereby proceeds rightwards in FIG. 5 and the interval between the first plate 41a and the second plates 41b is reduced. Accordingly, braking force onto the spool shaft 16 is increased. In contrast, braking force is reduced by turning the brake knob 42 in the counterclockwise direction.

When regulation of braking force is finished, the clutch operating member 17 is pressed downwards. The clutch operating member 17 is herein moved to a downward disengaged position. Further, the clutch yoke 35 is moved outwards in conjunction with movement of the clutch operating member 17. The pinion gear 32, engaged with the clutch yoke 35, is also moved in the same direction as the clutch yoke 35. As a result, engagement between the pinion gear 32 and the engaging pin 13a of the spool shaft 16 is released and the clutch-off state is thereby produced. In the clutch-off state, rotation from the handle shaft 30 is not transmitted to the spool 12 and the spool shaft 16. Therefore, the spool 12 can be freely rotated. When the clutch-off state is thus produced, an angler drops the fishing line by tilting the reel for arranging the spool shaft 16 along a vertical plane while thumbing the fishing line wound about the spool 12 by the thumb of the hand holding and palming the first side cover 6a. The spool 12 is accordingly rotated in the fishing-line releasing direction by the weight of a terminal tackle and the fishing line is reeled out.

The brake knob 42 is herein disposed in the recess 6c of the first side cover 6a disposed oppositely to the handle 2 attachment side while being prevented from protruding from the first side cover 6a. Therefore, the brake knob 42 does not make contact with the angler's palm even when palming is executed on the first side cover 6a side. With the structure, palming can be easily executed on the opposite side of the handle 2 attachment side.

Further, the handle 2 is rotated in the fishing-line winding direction when a fish bites after the fishing line is reeled out. In response, rotation is transmitted from the first gear 28 to the second gear 25, and the fishing line guide 27 of the level winding mechanism 15 is reciprocated in front of the spool 12 along the spool shaft direction. Accordingly, the fishing line is uniformly wound about the spool 12. In actuating the level winding mechanism 15, the fishing line guide 27 can become immovable due to a factor such as attachment of foreign material onto the traverse cam shaft 26. When the handle 2 is herein forcibly rotated, large torque acts on the first gear 28 and the second gear 25. When a large amount of torque acts on the first gear 28 beyond its acceptable limit, the pin members 51 retract into the through hole 30a against the urging force of the urging member 52, and the handle shaft 30 is rotated with respect to the first gear 28. Accordingly, torque is restricted from being transmitted from the handle shaft 30 to the first gear 28. In this case, members for restricting transmission torque, i.e., the pin members 51 and the urging member 52 are disposed on the handle shaft 30, and it is only required to form at least one locking recess 53 on the first gear 28. Therefore, the first gear 28 can be compactly formed.

Features

The aforementioned exemplary embodiment can be expressed as follows.

(A) The torque limiter 39 as a torque limiting device is a device configured to limit torque between the handle shaft 30 as a rotatable shaft member and the first gear 28 as a rotary member disposed on the outer peripheral side of the handle shaft 30. The torque limiter 39 includes at least one pin member 51, at least one urging member 52 and at least one locking recess 53. At least one pin member 51 is a member with a spherical tip. The pin member 51 can be protruding towards and retracting from the first gear 28 while being disposed in the handle shaft 30. At least one urging member 52 is disposed in the handle shaft 30 and urges the pin member 51 towards the first gear 28. At least one locking recess 53 is formed on the first gear 28 for allowing the tip of the pin member 51 to be engaged therewith.

In the torque limiter 39, the tip (i.e., the head portion 51a) of the pin member 51 is normally engaged with the locking recess 53 while the pin member 51 is urged towards the first gear 28 by the urging member 52. Accordingly, rotation is transmitted from the handle shaft 30 to the first gear 28 or vice versa. When torque to be transmitted exceeds allowable torque set in accordance with the urging force of the urging member 52, the pin member 51 retracts into the through hole 30a of the handle shaft 30 against the urging force of the urging member 52. Accordingly, the first gear 28 and the handle shaft 30 can be rotated relatively to each other. Accordingly, torque to be transmitted is restricted. In this case, members for restricting transmission torque, i.e., the pin member 51 and the urging member 52 are disposed on the handle shaft 30, and it is only required to form at least one locking recess 53 on the first gear 28. Therefore, the first gear 28 can be compactly formed.

(B) In the torque limiter 39, the surface of the locking recess 53, to which the tip of the pin member 51 is contacted, has the slope 53c intersecting with the axis of the handle shaft 30. In this case, when the pin member 51, pressed by the urging member 52, makes contact with the slope 53c of the locking recess 53, force of axially pressing the first gear 28 is generated by the slope. Accordingly, the first gear 28 is prevented from being easily wobbled.

(C) In the torque limiter 39, the pin member 51 has the head portion 51a having a spherical tip and the shaft portion 51b having a diameter smaller than that of the head portion 51a. In this case, the urging member 52 formed in a coil spring shape can be compactly disposed on the outer peripheral side of each small-diameter shaft portion 51b.

(D) In the torque limiter 39, two pin members 51 are disposed. The two pin members 51 are disposed along the diameter of the handle shaft 30 while the head portions 51a thereof are directed radially outwards. Further, one urging member 52 is disposed. The urging member 52 is a coil spring disposed on the outer peripheral side of the two shaft portions 51b while being disposed between the two head portions 51a.

In this case, the two pin members 51 can be urged by a single coil spring using a step produced in each pin member 51 between the head portion 51a and the small-diameter shaft portion 51b. Therefore, the diameter of the handle shaft 30 can be reduced. Further, the pin members 51 and the urging member 52 can be easily accommodated only by forming the through hole 30a along the diameter of the handle shaft 30.

(E) In the torque limiter 39, the locking recesses 53, the number of which is greater than that of the pin members 51, are circumferentially aligned at predetermined intervals. In this case, even when two pin members 51 are provided, the pin members 51 can protrude into the next locking recesses 53 in the rotational direction when transmission torque is reduced.

(F) In the torque limiter 39, the rotary member is a gear member configured to transmit rotation of the handle shaft to the traverse cam shaft of the level winding mechanism. In this case, it is possible to compactly form either the first gear 28 configured to transmit rotation to the traverse cam shaft of the level winding mechanism or the second gear 25.

(G) The shaft member is the handle shaft 30 of the dual-bearing reel that is prevented from rotating in the fishing-line releasing direction. In this case, the first gear 28 to be mounted on the handle shaft 30 can be compactly formed.

(H) The shaft member is the traverse cam shaft 26. In this case, the second gear 25 to be mounted on the traverse cam shaft 26 can be compactly formed.

Other Exemplary Embodiments

An exemplary embodiment of the present invention has been explained above. However, the present invention is not limited to the aforementioned exemplary embodiment, and a variety of changes can be herein made without departing from the scope of the present invention.

Figure 8:
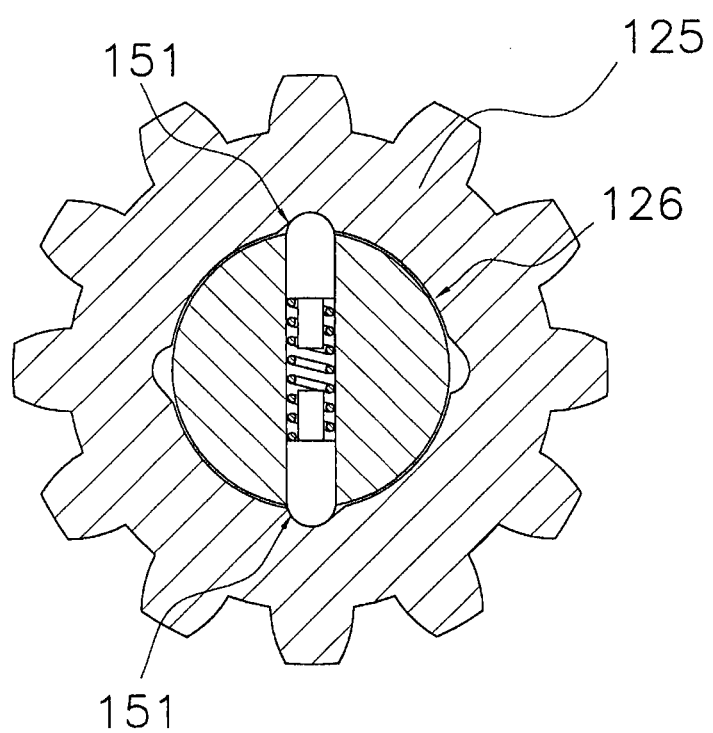
FIG. 8 is a cross-sectional view of a part of the handle shaft which corresponds to FIG. 6 described in another exemplary embodiment of the present invention.

(a) In the aforementioned exemplary embodiment, the handle shaft 30 has been exemplified as a shaft member while the first gear 28 has been exemplified as a rotary member. However, the present invention is not limited to the above. For example, the spool shaft and the traverse cam shaft can be set as shaft members. Especially, when rotation of the spool shaft is transmitted to the traverse cam shaft through the intermediate gear as described in Specification of U.S. Pat. No. 2,523,134, as shown in FIG. 8, a pin member 151 can be disposed in the traverse cam shaft 126 having a diameter greater than that of the spools shaft. In this case, torque to be transmitted from the intermediate gear 125 to the traverse cam shaft 126 is restricted.

(b) In the aforementioned exemplary embodiment, a manual dual-bearing reel has been exemplified. However, the present invention can be applied to an electric dual-bearing reel. Further, the present invention can be applied to a dual-bearing reel with a handle configured to be rotated in the fishing-line releasing direction. Furthermore, the right handled dual-bearing reel has been exemplified. However, the present invention can be also applied to a left handled dual-bearing reel.

(c) In the aforementioned exemplary embodiment, the slope 53a and the cylindrical surface 53b are provided as the contact surface of the locking recess 53. However, the contact surface of the locking recess 53 can be formed by either of the slope 53a and the cylindrical surface 53b. For example, slopes can be formed on the both sides of the locking recess. Alternatively, cylindrical surfaces can be formed on the both sides of the locking recess. When the slopes 53a are herein formed on the both sides of the locking recess 53, starting torque in slip can be set to be low while rotation in slip can be smooth. When the cylindrical surfaces 53b are formed on the both sides of the locking recess, on the other hand, starting torque in slip can be set to be high. Simultaneously, a feeling of click is given to an angler and slip can be thereby easily recognized. Further, the first gear 28 is compatibly used between a left handled dual-bearing reel and a right-handled deal-bearing reel.

Advantageous Effects of Invention

According to the present invention, a pin member and an urging member, configured to limit transmission torque, are disposed on a shaft member and a recess is only required to be formed on a rotary member. Therefore, the rotary member can be compactly formed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A torque limiting device for a fishing reel, the torque limiting device comprising:
   a first pin member being disposed in the shaft member, the first pin member being configured to protrude towards and retract from the rotary member, the first pin member having a first spherical tip;
   an urging member being disposed in the shaft member, the urging member configured to urge the first pin member towards the rotary member; and
   a first recess disposed on the rotary member to allow the tip of the first pin member to be engaged therewith,
   the torque limiting device being configured to limit torque between a rotatable shaft member and a rotary member disposed on an outer peripheral side of the shaft member in the fishing reel.

2. The torque limiting device according to claim 1, wherein the first recess includes a surface making contact with the tip of the first pin member, and
   the surface has a slope intersecting with an axis of the shaft member.

3. The torque limiting device for a fishing reel according to claim 1, wherein
   the first pin member includes the first spherical tip as a head portion and a shaft portion having a diameter smaller than a diameter of the head portion.

4. The torque limiting device for a fishing reel according to claim 3, further comprising
   a second pin member being disposed in the shaft member, the second pin member being configured to protrude towards and retract from the rotary member, the second pin member having a second spherical tip, wherein
   the first and second pin members are disposed along a diameter of the shaft member while the head portions thereof arc respectively directed radially outwards, and
   the urging member is a coil spring being disposed between the two head portions on an outer peripheral side of the two shaft portions.

5. The torque limiting device according to claim 4, further comprising
   the number of recesses including the first recess is greater than the number of pin members including first and second pin members, and
   the recesses are aligned in a circumferential direction at predetermined intervals.

6. The torque limiting device according to claim 1., wherein
   the rotary member is a gear member being configured to transmit rotation of a handle shaft to a traverse cam shaft of a level winding mechanism of a dual-bearing reel.

7. The torque limiting device according to claim 6, wherein the shaft member is the handle shaft for the dual-bearing reel prevented from rotating in a fishing-line releasing direction.

8. The torque limiting device according to claim 6, wherein the shaft member is the traverse cam shaft.

9. A dual-bearing reel, comprising:
the torque limiting device according to claim 1.

* * * * *